US009642224B2

(12) United States Patent
Murakami (10) Patent No.: US 9,642,224 B2
(45) Date of Patent: May 2, 2017

(54) ILLUMINATION CONTROLLER AND LUMINAIRE CONTROL METHOD

(71) Applicant: Panasonic Intellectual Property Management Co., Ltd., Osaka (JP)

(72) Inventor: Yoshinobu Murakami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/188,444

(22) Filed: Jun. 21, 2016

(65) Prior Publication Data
US 2016/0381770 A1 Dec. 29, 2016

(30) Foreign Application Priority Data

Jun. 25, 2015 (JP) ................................. 2015-128053

(51) Int. Cl.
| | | |
|---|---|---|
| *H05B 37/02* | (2006.01) | |
| *H05B 33/08* | (2006.01) | |
| *H04W 4/00* | (2009.01) | |
| *H04W 84/20* | (2009.01) | |

(52) U.S. Cl.
CPC ........ *H05B 37/0272* (2013.01); *H04W 4/005* (2013.01); *H05B 33/0845* (2013.01); *H04W 84/20* (2013.01)

(58) Field of Classification Search
CPC ............................................... H05B 37/0272
USPC ........................................ 315/291, 292, 360
See application file for complete search history.

(56) References Cited

U.S. PATENT DOCUMENTS

| | | | | |
|---|---|---|---|---|
| 9,113,526 | B2 * | 8/2015 | Stewart | ................ H05B 33/086 |
| 2011/0279248 | A1 * | 11/2011 | Ogawa | ................... G08C 23/04 |
| | | | | 340/13.25 |
| 2012/0043889 | A1 * | 2/2012 | Recker | ............... H05B 33/0815 |
| | | | | 315/86 |

FOREIGN PATENT DOCUMENTS

| | | |
|---|---|---|
| JP | 2002-247671 | 8/2002 |
| JP | 2006-140764 | 6/2006 |
| JP | 2012-089277 | 5/2012 |
| JP | 2013-149480 | 8/2013 |

\* cited by examiner

*Primary Examiner* — Thuy Vinh Tran
(74) *Attorney, Agent, or Firm* — Renner, Otto, Boisselle & Sklar, LLP (57) ABSTRACT

An illumination controller includes a communication interface circuit configured to communicate with a luminaire via radio waves; an input device configured to obtain a manipulation instruction; and a control processor configured to generate at least a first command and a second command according to a corresponding manipulation instruction obtaining state of the input device, and transmit the command generated to the luminaire via the communication interface circuit, wherein, when the control processor has generated the first command according to the manipulation instruction obtaining state, the control processor is configured to repeatedly transmit the first command, generated to the luminaire at first transmission intervals, and when the control processor has generated the second command according to the manipulation instruction obtaining state, the control processor is configured to repeatedly transmit the second command generated to the luminaire at second transmission intervals different from the first transmission intervals.

7 Claims, 7 Drawing Sheets

| MANIPULATION | FUNCTION | TYPE OF COMMAND | COMMAND DIMMING LEVEL | FADE PERIOD | TRANSMISSION INTERVALS AND TIMES OF TRANSMISSION IN REPEATED TRANSMISSION |
|---|---|---|---|---|---|
| PUSH OF UP BUTTON | INCREASE DIMMING LEVEL BY 1% | DIMMING | 1% UP FROM STORED VALUE | 0 MSEC | TRANSMIT THREE TIMES AT 200-MSEC INTERVALS |
| PUSH OF DOWN BUTTON | DECREASE DIMMING LEVEL BY 1% | DIMMING | 1% DOWN FROM STORED VALUE | 0 MSEC | TRANSMIT THREE TIMES AT 200-MSEC INTERVALS |
| HOLD DOWN OF UP BUTTON | CONTINUOUSLY INCREASE DIMMING LEVEL | DIMMING | GRADUALLY INCREASED AT 200-MSEC INTERVALS | 200 MSEC | GRADUALLY INCREASE AT 200-MSEC INTERVALS AND TRANSMIT LAST VALUE THREE TIMES AT 200-MSEC INTERVALS |
| HOLD DOWN OF DOWN BUTTON | CONTINUOUSLY DECREASE DIMMING LEVEL | DIMMING | GRADUALLY DECREASED AT 200-MSEC INTERVALS | 200 MSEC | GRADUALLY DECREASE AT 200-MSEC INTERVALS AND TRANSMIT LAST VALUE THREE TIMES AT 200-MSEC INTERVALS |
| TURN ON OF ON/OFF BUTTON | CAUSE LUMINAIRE TO ILLUMINATE AT STORED DIMMING LEVEL | DIMMING | STORED VALUE | 200 MSEC | TRANSMIT THREE TIMES AT 200-MSEC INTERVALS |
| TURN OFF OF ON/OFF BUTTON | TURN LUMINAIRE OFF | DIMMING | 0 | 200 MSEC | TRANSMIT THREE TIMES AT 200-MSEC INTERVALS |
| NO MANIPULATION | MAINTAIN CURRENT STATE/ DIMMING LEVEL | DIMMING | STORED VALUE | 1000 MSEC | REPEAT AS LONG AS "NO MANIPULATION" CONTINUES AT 1-SEC INTERVALS |
| POWER-ON | CAUSE LUMINAIRE TO ILLUMINATE AT STORED DIMMING LEVEL | DIMMING | STORED VALUE | 1000 MSEC | TRANSMIT THREE TIMES AT 200-MSEC INTERVALS |

ILLUMINATION CONTROLLER AND LUMINAIRE CONTROL METHOD

CROSS REFERENCE TO RELATED APPLICATION

This application claims the benefit of priority of Japanese Patent Application Number 2015-128053 filed on Jun. 25, 2015, the entire content of which is hereby incorporated by reference.

BACKGROUND

1. Technical Field

The present disclosure relates to illumination controllers and luminaire control methods, and relates in particular to an illumination controller and a luminaire control method for controlling a luminaire by transmitting a command to the luminaire via radio waves.

2. Description of the Related Art

Illumination controllers (or wireless master units) which dim light of a luminaire by transmitting a command to the luminaire via radio waves have conventionally been proposed (see Patent Literature 1 (PTL 1): Japanese Unexamined Patent Application Publication No. 2006-140764, for example).

According to the technique of PTL 1, a wireless master unit periodically transmits a dimming control signal to a luminaire including a wireless slave unit and receives monitoring data transmitted from the wireless slave unit during intervals of the transmission of the dimming control signals. With this, transmission of not only the control signals but also the monitoring data is possible with one pair of wireless units without increasing the communication speed.

SUMMARY

With the technique of PTL 1, however, the luminaire may not be properly controlled if a plurality of wireless master units are installed in a nearby place, due to interference (radio wave interference) of dimming control signals from the plurality of wireless master units. For this reason, there is a problem that when a wireless master unit is installed at a given place, another wireless master unit cannot be installed within the reach of radio waves from the former wireless master unit.

In view of this, it is an object of the present disclosure to provide an illumination controller and a luminaire control method which can ensure that even when a plurality of illumination controllers are installed within the reach of radio waves, interference of commands transmitted by the illumination controllers does not easily occur.

In order to achieve the above object, an illumination controller according to an aspect of the present disclosure is an illumination controller which controls a luminaire by transmitting a command to the luminaire via radio waves, the illumination controller including a communication interlace circuit configured to communicate with the luminaire via radio waves; an input device configured to obtain a manipulation instruction; and a control processor configured to generate at least a first command and a second command according to a corresponding manipulation instruction obtaining state of the input device, and transmit the command generated to the luminaire via the communication interlace circuit, wherein, when the control processor has generated the first command according to the manipulation instruction obtaining state, the control processor is configured to repeatedly transmit the first command generated to the luminaire at first transmission intervals, and when the control processor has generated the second command according to the manipulation instruction obtaining state, the control processor is configured to repeatedly transmit the second command generated to the luminaire at second transmission intervals different from the first transmission intervals.

Furthermore, a luminaire control method according to an aspect of the present disclosure is a luminaire control method to be used by an illumination controller to control a luminaire by transmitting a command to the luminaire via radio waves, the method including generating at least a first command and a second command according to a corresponding manipulation instruction obtaining state, and transmitting the command generated to the luminaire, wherein, in the generating and the transmitting, when the first command is generated according to the manipulation instruction obtaining state, the first command generated is repeatedly transmitted to the luminaire at first transmission intervals, and when the second command is generated according to the manipulation instruction obtaining state, the second command generated is repeatedly transmitted to the luminaire at second transmission intervals different from the first transmission intervals.

With an illumination controller and a luminaire control method according to the present disclosure, even when a plurality of illumination controllers are installed within the reach of radio waves, interference of commands transmitted by the illumination controllers does not easily occur as compared to the conventional techniques.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, an embodiment of the present disclosure will be described in detail with accompanying drawings. It is to be noted that the embodiment described below is to show a preferable specific example of the present disclosure. The numerical values, shapes, materials, structural elements, the arrangement and connection of the structural elements, steps, the processing order of the steps etc., shown in the following embodiment are mere examples, and are therefore not intended to limit the present disclosure. Furthermore, among the structural elements in the following embodiment, structural elements not recited in any one of the independent claims representing the most generic concepts of the present disclosure are described as arbitrary structural, elements of a more preferable embodiment.

Figure 1:
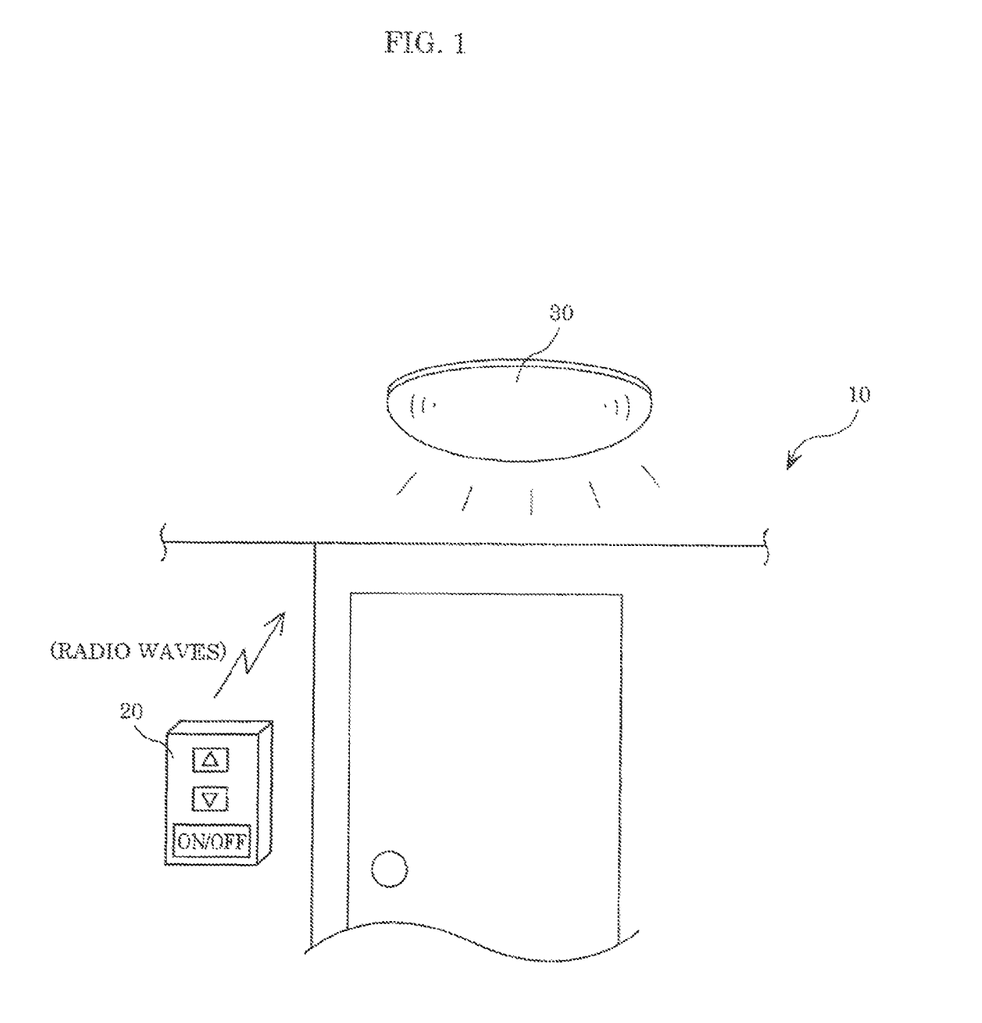
FIG. 1 is an external view illustrating a configuration of an illumination system according to an embodiment.

FIG. 1 is an external view illustrating a configuration of illumination system 10 according to an embodiment. Illumination system 10 is a system which provides dimmable illumination light and includes illumination controller 20 and luminaire 30. In the present embodiment, illumination controller 20 and luminaire 30 have already finished a pairing operation (which is to store the identifier of each other) for wireless communication and thus can wirelessly communicate with each other.

Illumination controller 20 is a console (radio wave remote control which controls luminaire 30 by transmitting a command to luminaire 30 via radio waves, and is fixed, to a wall of a room, for example.

Luminaire 30 is equipment which changes illumination state according to a dimming command received via radio waves from illumination controller 20, and is a light-emitting diode (LED) illumination apparatus, for example.

Although FIG. 1 illustrates only one luminaire 30, a plurality of luminaires may be controlled by illumination controller 20. In other words, illumination system 10 nm include a plurality of luminaires.

Furthermore, although FIG. 1 illustrates one illumination system 10, a plurality of illumination systems may be set within the reach of radio waves. Illumination system 10 according to the present embodiment is devised in such a manner as described later that even when a plurality of illumination controllers are installed within the reach of radio waves, interference of commands transmitted by the illumination controllers does not easily occur.

Figure 2:
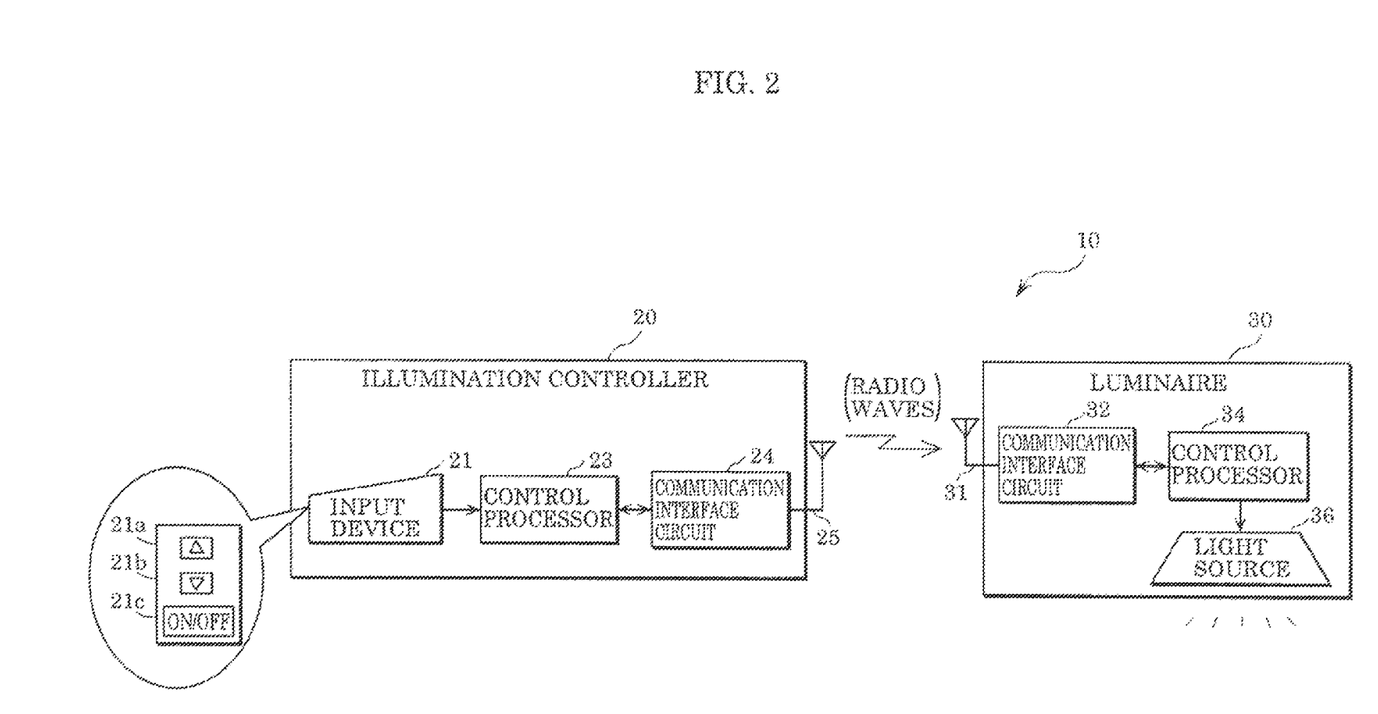
FIG. 2 is a block diagram illustrating configurations of an illumination controller and a luminaire illustrated in FIG. 1.

FIG. 2 is a block diagram illustrating configurations of illumination controller 20 and luminaire 30 illustrated in FIG. 1.

Illumination controller 20 includes input device 21, control processor 23, and communication interface circuit 24.

Input device 21 is an input device which obtains a manipulation instruction and, in the present embodiment, includes up button 21a, down button 21b, and on/off button 21c as illustrated in FIG. 2. Up button 21a and down button 21b are dimming buttons for changing the brightness of luminaire 30 (a button for increasing a dimming level and a button for decreasing the dimming level) and are, for example, momentary switches, which turn on only while they are pushed. On/off button 21c is an on/off button for turning on and off the operation of illumination controller 20 and is, for example, an alternate switch, which reverses ON and OFF at every push. Input device 21 obtains a manipulation on the dimming buttons (up button 21a and down button 21b) or the on/off button (on/off button 21c) as a manipulation instruction for changing the brightness of luminaire 30.

Communication interface circuit 24 is a communication interface which communicates with luminaire 30 via radio waves through, antenna 25 and is, for example, a communication adapter for a wireless local area network (LAN).

Control processor 23 is a circuit which generates a command according to a manipulation instruction obtaining state of input device 21 and transmits (or repeatedly transmits) the command generated to luminaire 30 via communication interface circuit 24. Control processor 23 is, for example, a one-chip microcomputer including a nonvolatile memory, a processor which runs a control program stored in the nonvolatile memory in order to carry out the functions described herein, a volatile memory, an input/output port, and a timer, for example. Control processor 23 stores a value (for example, a dimming level) indicating an illumination state of luminaire 30 in the nonvolatile memory included in control processor 23, and updates the value stored in the nonvolatile memory when a manipulation for changing the illumination state of luminaire 30 is detected via input device 21.

In the present embodiment, the cases where a command is repeatedly transmitted include the following two cases. One is where completely identical commands are repeatedly transmitted to ensure wireless communication. In this case, luminaire 30 which has received commands abandons commands received for and after the second time if luminaire 30 has repeatedly received the commands at intervals shorter than or equal to predetermined intervals, and executes the commands received for and after the second time if luminaire 30 has repeatedly received the commands at intervals longer than the predetermined intervals. Another case is where the brightness of the luminaire 30 is to be slowly changed. In this case, illumination controller 20 repeatedly transmits commands of the same type (dimming commands) to luminaire 30 while gradually changing parameters which are included in the respective commands and are specifying the brightness. Luminaire 30 which has repeatedly received such commands slowly changes the brightness according to the commands.

Here, the commands generated by control processor 23 include at least two types of commands (a first command and a second command) to be repeatedly transmitted. Specifically, when control processor 23 has generated the first command according to a manipulation instruction obtaining state of manipulation unit 21, control processor 28 repeatedly transmits the first command generated to luminaire 30 at first transmission intervals. On the other hand, when control processor 28 has generated the second command according to a manipulation instruction obtaining state of input device 21, control processor 28 repeatedly transmits the second command generated to luminaire 30 at second transmission intervals different from the first transmission intervals.

In the present embodiment, the first command is a predetermined command indicating a need to immediately change the state of luminaire 30. On the other hand, the second command is a predetermined command indicating no need to immediately change the state of luminaire 30. The first transmission intervals are shorter than the second transmission intervals.

Specifically, the first command is a first dimming command, for changing the brightness of luminaire 30. The second command is a second dimming command for maintaining the brightness of luminaire 30. Control processor 23 generates the first dimming command and repeatedly transmits the first dimming command to luminaire 30 at the first transmission intervals when input device 21 has obtained the manipulation instruction for changing the brightness of luminaire 30. The first transmission intervals are a minimum time period determined in consideration of for example, a time period it takes for detecting a manipulation on input device 21, and is 200 msec, for example. On the other hand, control processor 23 generates the second dimming command, and repeatedly transmits the second dimming command to luminaire 30 at the second transmission intervals when input device 21 has obtained no manipulation instruction for a time period longer than or equal to a certain time period. The second transmission intervals are a time period which does not make the user feel strange in terms of luminosity factor with respect to a change in the brightness, and is 1 sec, for example.

As a specific manipulation, control processor 23 repeatedly transmits the first dimming command at the first transmission intervals to gradually change the brightness of luminaire 30 when the dimming button (up button 21a or down button 21b) is continuously pushed (held down), for example. The first dimming command which is repeatedly transmitted includes a parameter specifying the brightness. The first dimming command which is repeatedly transmitted includes a parameter for gradually changing the brightness of luminaire 30, and the parameter is changed according to the brightness of luminaire 30.

It is to be noted that the commands generated by control processor 23 may include not only the first command and the second command but also other types of commands. For example, a third dimming command to be repeatedly transmitted at third transmission intervals longer than the second transmission intervals may be included. For example, the third dimming command is a command for checking that the communication channel between illumination controller 20 and luminaire 30 is maintained in a normal state (a state in which communication is possible). The third transmission intervals are a time period of temporary disconnection in the communication between illumination controller 20 and luminaire 30, which is considered to be acceptable as dimming control, and is 60 seconds, for example. When luminaire 30 cannot receive the third dimming command repeatedly transmitted at the third transmission intervals, luminaire 30 can maintain a certain illumination state (for example, illumination using a built-in storage battery), recognizing that the communication channel between illumination controller 20 and luminaire 30 is in an abnormal state (communication is disconnected).

Illumination controller 20 may further include a display unit including an LED, for example. The display unit may present a display corresponding to the current dimming level or a display corresponding to a manipulation on input device 21, under the control of control processor 28.

Luminaire 30 includes antenna 31, communication interface circuit 32, control processor 34, and light source 36.

Communication interlace circuit 32 is a communication interface which communicates with, illumination controller 20 via radio waves through antenna 31, and is a communication adapter for a wireless LAN, for example.

Light source 36 is a light source which emits illumination light under the control of control processor 34, and includes a dimming circuit and an LED, for example.

Control processor 34 is a control circuit which controls light source 36 according to a command received from illumination controller 20 via communication interface circuit 32. Control processor 34 is, for example, a one-chip microcomputer including a nonvolatile memory, a processor which runs, a control program stored in the nonvolatile memory in order to carry out the functions described herein, a volatile memory, an input/output port, and a timer, for example.

Next, an operation of illumination system 10 according to the present embodiment having the above configuration will be described.

Figure 3:
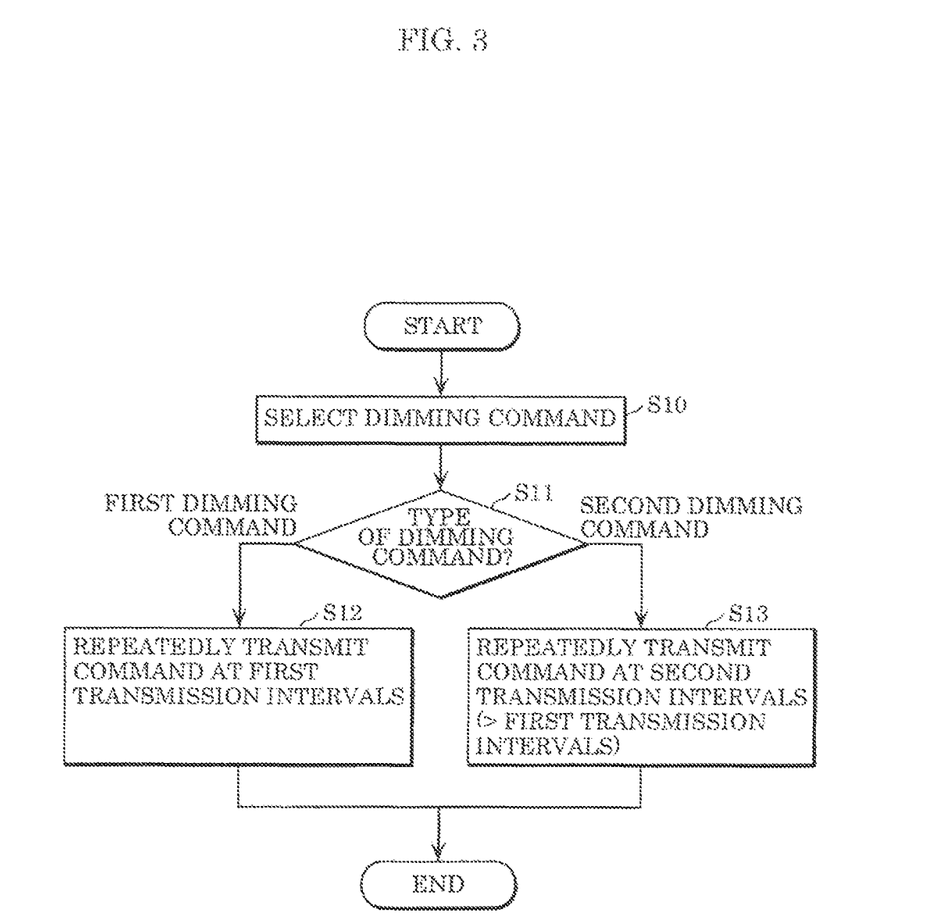
FIG. 3 is a flow chart illustrating a characteristic operation of an illumination controller included in an illumination system according to an embodiment.

FIG. 3 is a flow chart illustrating a characteristic operation of illumination controller 20 included in illumination system 10 according to the present embodiment, FIG. 3 illustrates a procedure ("generating and transmitting" included in "a luminaire control method") performed when illumination controller 20 transmits one of two types of dimming commands (the first dimming command, and the second dimming command) to luminaire 30 according to a manipulation instruction obtaining state of input device 21.

Control processor 23 of illumination controller 20 first detects a manipulation instruction obtaining state of input device 21, and generates a command (here, one of the two types of dimming commands) according to the manipulation instruction obtaining state detected (S10). For example, control processor 23 generates the first dimming command when input device 21 has obtained a manipulation instruction for changing the brightness of luminaire 30 (push of up button 21a, down button 21b, or on/off button 21c). The first dimming command is an example of a predetermined first command indicating a need to immediately change the state of luminaire 30, and is a command for changing the brightness of luminaire 30. Furthermore, control processor 28 generates the second dimming command when input device 21 has obtained no manipulation instruction for at least a certain time period. The second dimming command is an example of a predetermined command indicating no need to immediately change the state of luminaire 30, and is a command for maintaining the brightness of luminaire 30.

In the case of generating the first dimming command ("first dimming command" in Step S11), control processor 23 repeatedly transmits the first dimming command generated to luminaire 30 at the predetermined first transmission intervals (S12). Control processor 34 of luminaire 30 to which the first dimming command has been transmitted receives the first dimming command via communication interface circuit 32, interprets the first dimming command received, and dims the light of light source 36 according to the first dimming command. It is to be noted that when the commands (here, the first dimming commands) repeatedly received at intervals (here, the first transmission intervals) shorter than or equal to predetermined intervals are identical, control processor 34 does not perform any control (that is, abandons the completely identical commands received for and after the second time).

On the other hand, in the case of generating the second dimming command ("second dimming command" in Step S11), control processor 23 repeatedly transmits the second dimming command generated, to luminaire 30 at the predetermined, second transmission intervals (>the first transmission intervals) (S13). Control processor 34 of luminaire 30 to which the second dimming command has been transmitted receives the second dimming command via communication interface circuit 32, interprets the second dimming command received, and dims the light of light source 36 according to the second dimming command (performs control to maintain the brightness indicated immediately before). It is to be noted that in the case of receiving a command (here, the second dimming command) at intervals (here, the second transmission intervals) longer than the predetermined intervals, control processor 34 performs control according to the received command even when the received command is identical to the command received immediately before.

As described above, with illumination system 10 according to the present embodiment, the transmission intervals at which illumination controller 20 repeatedly transmits a command to luminaire 30 is different depending on the type of the command. Thus, even when a plurality of illumination controllers are installed within the reach of radio waves, it is possible to ensure that interference of commands transmitted by the illumination controllers does not easily occur.

Furthermore, the first dimming command indicating a need to immediately change the state of luminaire 30 is repeatedly transmitted at transmission intervals shorter than the transmission intervals of the second dimming command indicating no such need. Thus, changing the transmission intervals depending on the type of the dimming command reduces the feeling of strangeness imparted to the manipulator of the illumination controller.

Figure 4:
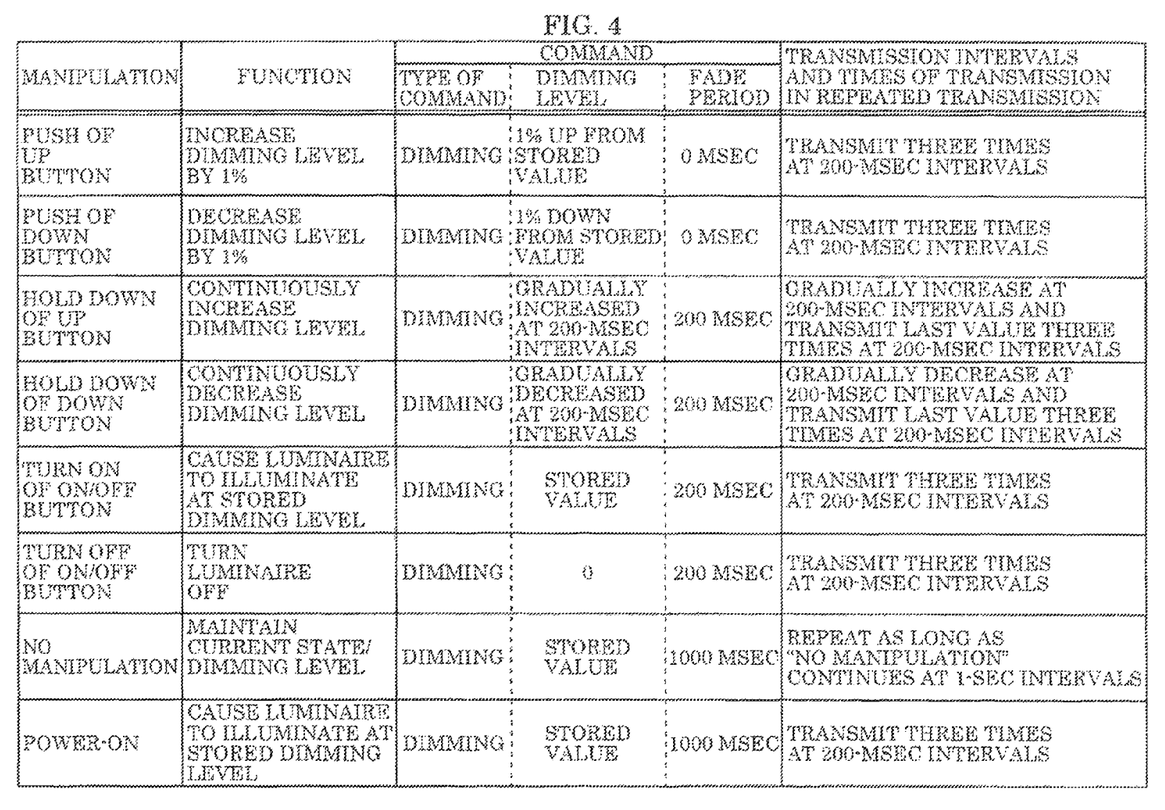
FIG. 4 is a diagram illustrating specific examples of cases where an illumination controller included in an illumination system according to an embodiment repeatedly transmits a dimming command.

FIG. 4 is a diagram illustrating specific examples of cases where illumination controller 20 included in illumination system 10 according to the present embodiment repeatedly transmits a dimming command. What is illustrated here is a table showing, for each specific "manipulation" performed with a button, the "function" of the manipulation, parameters ("type of command", "dimming level", and "fade period") in the "dimming command", and the "transmission intervals and times of transmission in repeated transmission" of the dimming command.

It is to be noted that "push" of a button under the item "manipulation" in FIG. 4 means a state of a button being pushed only for a predetermined short time period, and is, for example, a state in which the push is successively detected 3 times or more but less than 50 times at 10·msec intervals. "Hold down" of a button means a state of a button being pushed longer than the predetermined time period, and is, for example, a state in which the push is successively detected 50 times or more at 10·msec intervals. "No manipulation" means a state of input device 21 being unmanipulated, and is, for example, a state in which no push of any button is successively detected 3 times or more at 10·msec intervals.

As the "command" in FIG. 4 shows, the dimming command in the present embodiment includes, as data formats, three parameters starting from "type of command", "dimming level" and "fade period" in this order. "Type of command" is a parameter indicating the type of command. Although FIG. 4 only illustrates the ease where the "type of command" is set to the parameter of "dimming" which denotes a dimming command, the "type of command" may be set to other types of command (for example, a command for transmitting the identifier of illumination controller 20). "Dimming level" is a parameter specifying the brightness of luminaire 30. Here, this parameter is set to an integer which specifies the brightness given that the brightness of full illumination (maximum brightness) is 100(%). "Fade period" is a parameter specifying a transition period over which the current brightness is changed, by means of lading, to the brightness specified by the "dimming level", and is set to an integer in milliseconds (msec), for example.

For each "manipulation" in FIG. 4, control processor 23 repeatedly transmits the dimming command in the following manner.

When "push of up button 21a" is detected, control processor 23 generates a dimming command for increasing the dimming level by 1% from the current dimming level, and repeatedly transmits the dimming command generated to luminaire 30 three times at 200·msec intervals. The current dimming level is a value stored inside (nonvolatile memory) of control processor 23. This dimming command has the "type of command" set to "dimming", the "dimming level" set to "1% up from stared value (value stored inside)", and the "fade period" set to 0 (msec). This transmission corresponds to the ease of repeatedly transmitting completely-identical commands (first dimming commands) at the first transmission intervals to ensure wireless communication.

When "push of down button 21b" is detected, control processor 23 generates a "dimming command" for decreasing the dimming level by 1% from the current dimming level, and repeatedly transmits the dimming command generated to luminaire 30 three times at 200·msec intervals. The basic processing is the same as in the case of "push of up button 21a".

When "hold down of up button 21a" is detected, control processor 23 repeatedly transmits to luminaire 30 a dimming command for continuously increasing the dimming level at a constant slope at 200·msec intervals while the "hold down" continues. The "constant slope" is, for example, a proportion in a range from 0% to 100% at which the dimming level changes in 8 seconds. This dimming command has the "type of command" set to "dimming", the "dimming level" set to "gradually increased at 200·msec intervals", and the "fade period" set to 200 (msec). This transmission, corresponds to the case of repeatedly transmitting commands of the same type (first dimming commands) at the first transmission intervals while gradually changing the "dimming level" included in each command, to slowly change the brightness of luminaire 30. When a finish of "hold down" is detected, control processor 23 repeatedly transmits to luminaire 30 the same dimming command as the dimming command transmitted last, 3 times at 200·msec intervals. This transmission corresponds to the case of repeatedly transmitting completely-identical commands (first dimming commands) at the first transmission intervals to ensure wireless communication.

When "hold down of down button 21b" is detected, control processor 23 repeatedly transmits to luminaire 30 a dimming command for continuously decreasing the dimming level at a constant slope at 200·msec intervals while the "hold down" continues. The basic processing is the same as in the case of "hold down of up button 21a".

When the manipulation "turn on of on/off button 21c" is detected, control processor 23 generates a dimming command for causing luminaire 30 to illuminate at the stored dimming level, and repeatedly transmits the dimming command generated to luminaire 30 three times at 200·msec intervals. This dimming command has the "type of command" set to "dimming", the "dimming level" set to the "stored value" (value stored inside), and the "fade period" set to 200 (msec). This transmission corresponds to the ease of repeatedly transmitting completely-identical commands (first dimming commands) at the first transmission intervals to ensure wireless communication.

When the manipulation "turn off of on/off button 21c" is detected, control processor 23 generates a dimming command for turning luminaire 30 off, and repeatedly transmits the dimming command generated to luminaire 30 three times at 200·msec intervals. this dimming command has the "type of command" set to "dimming", the "dimming level" set to "0", and the "fade period" set to 200 (msec). This transmission corresponds to the case of repeatedly transmitting completely-identical commands (first dimming commands) at the first transmission intervals to ensure wireless communication.

When "no manipulation" is detected, control processor 23 generates a dimming command for maintaining the illumination of luminaire 30 at the stared dimming level, and repeatedly transmits the dimming command generated to luminaire 30 at 1000·msec intervals while "no manipulation" continues. This dimming command has the "type of command" set to "dimming", the "dimming level" set to the "stored value" (value stored inside), and the "fade period" set to 1000 (msec). This transmission corresponds to the case of repeatedly transmitting completely-identical commands (second dimming commands) at the second transmission intervals to ensure wireless communication.

When "power-on" is detected, control processor 23 generates a dimming command for causing luminaire 30 to illuminate at the stored dimming level, and repeatedly transmits the dimming command generated to luminaire 30 three times at 200·msec intervals. The "power-on" is detected by control processor 23 through an ON manipulation on a power button (not illustrated) by input device 21 or through reset of control processor 23 by power-on. This dimming command has the "type of command" set to "dimming", the "dimming level" set to the "stored value" (value stored inside), and the "fade period" set to 200 (msec). This transmission corresponds to the case of repeatedly transmitting completely-identical commands (second dimming commands) at the second transmission intervals to ensure wireless communication.

Figure 5:
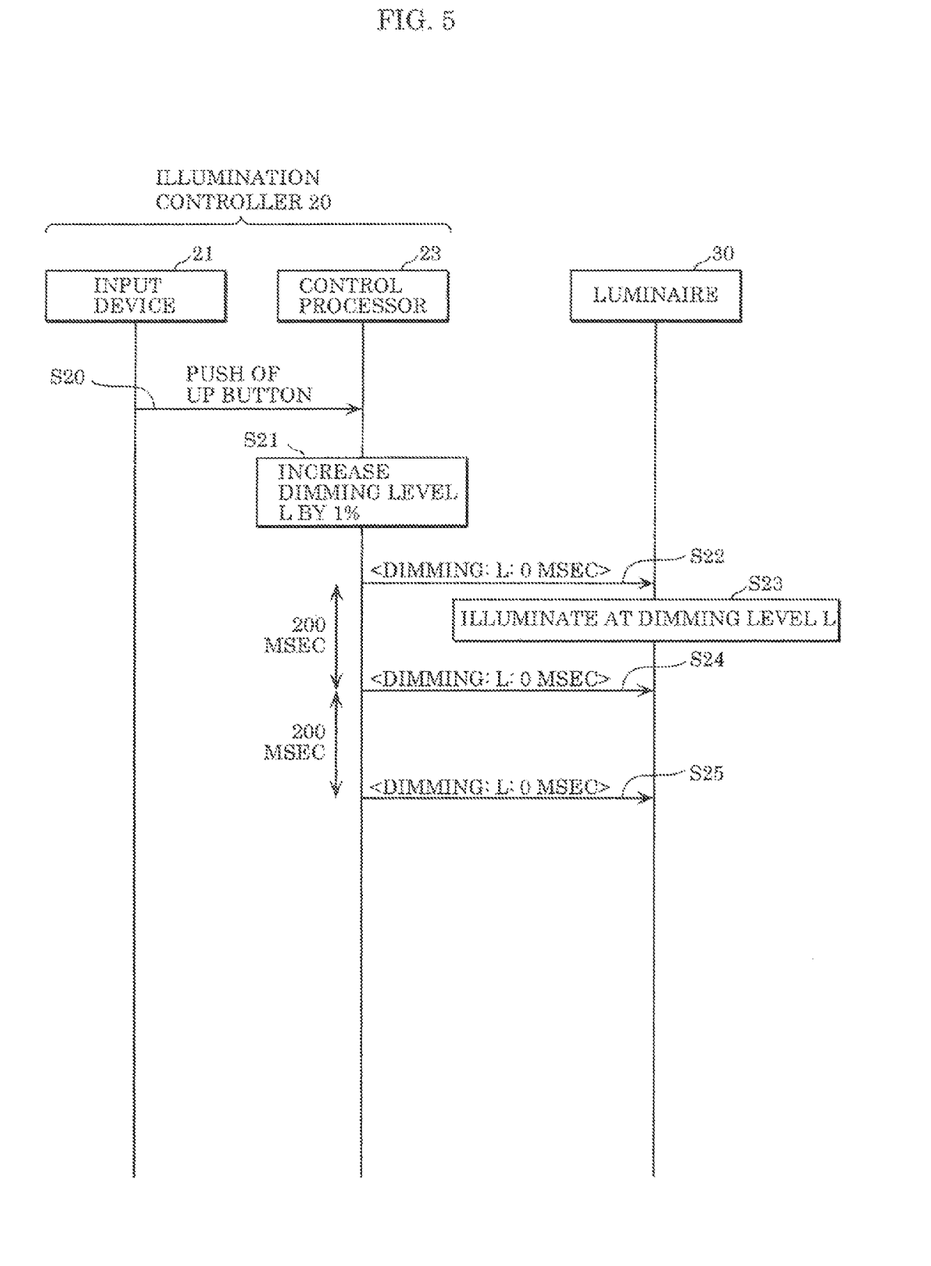
FIG. 5 is a communication sequence diagram illustrating communication between an illumination controller and a luminaire when a manipulation "push of up button" illustrated in FIG. 4 is performed.

FIG. 5 is a communication sequence diagram illustrating communication between illumination controller 20 and luminaire 30 when the manipulation "push of up button 21a" illustrated in FIG. 4 is performed.

In illumination controller 20, when "push of up button 21a" is detected (S20), control processor 28 generates a dimming command for increasing the dimming level by 1% from the current dimming level, (value stored inside) (S21). This dimming command has the "type of command" set to "dimming", the "dimming level" set to "dimming level L: 1% up from stored value (value stored inside)", and the "fade period" set to 0 (msec). Control processor 23 then repeatedly transmits the dimming command generated to luminaire 30 three times at 200·msec intervals (S22, S24, and S25).

In luminaire 30, control processor 34 detects that dimming level L included in the dimming command received the first time is different from the current value (dimming level stored inside), and causes light source 36 to illuminate at dimming level L (S23). Control processor 34 abandons the dimming commands received for the second time and the third time, recognizing that these dimming commands are completely identical to the dimming command received immediately before and are commands repeatedly received at intervals shorter than or equal to predetermined intervals (for example, 300·msec intervals). It is to be noted that when control processor 34 cannot receive the dimming command transmitted for the first time due to, for example, a problem with the communication circumstance, control processor 34 responds to the dimming command transmitted for the second time if control processor 34 is able to detect the dimming command transmitted for the second time. When control processor 34 cannot receive the dimming command transmitted for the second time, control processor 34 responds to the dimming command transmitted for the third time if control processor 34 is able to detect the dimming command transmitted for the third time.

Figure 6:
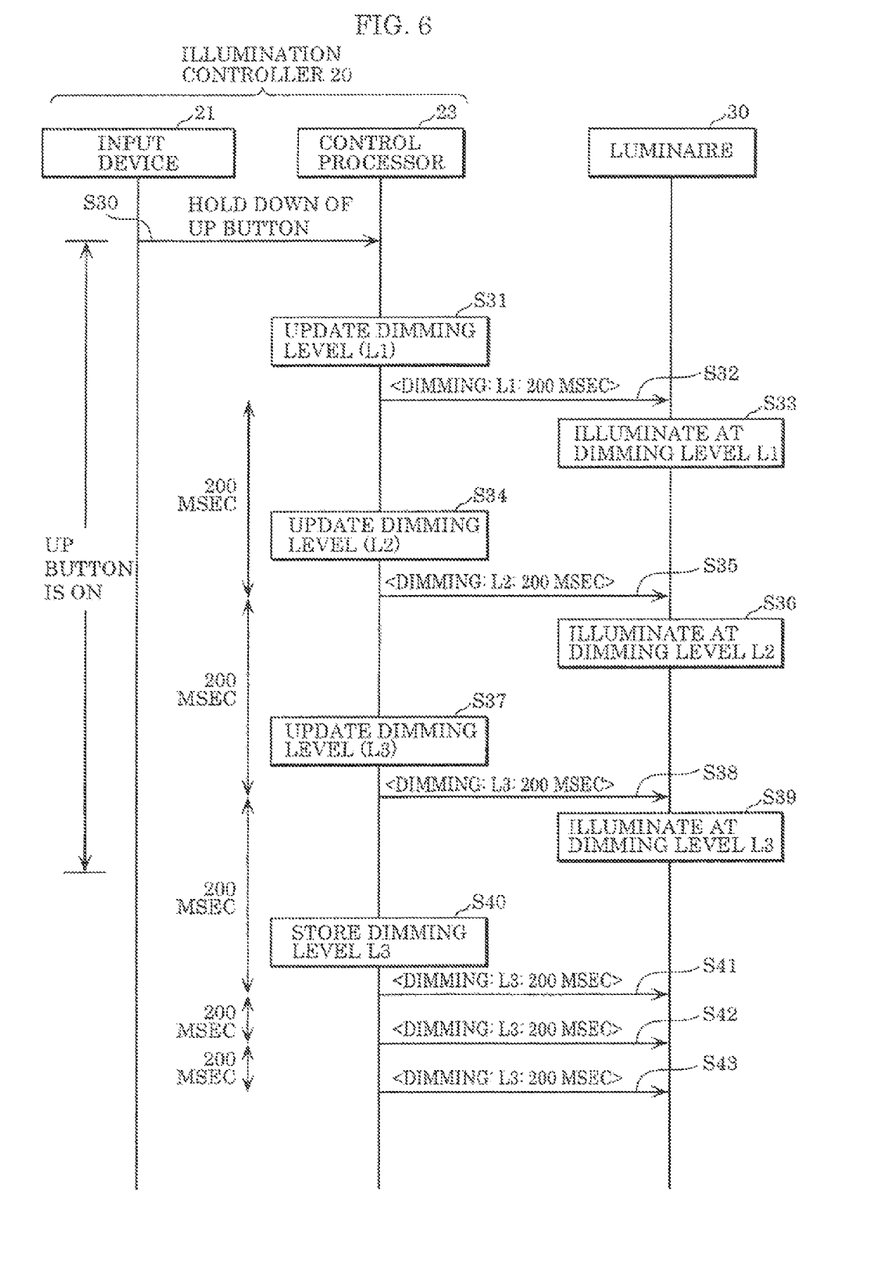
FIG. 6 is a communication sequence diagram illustrating communication between an illumination controller and a luminaire when a manipulation "hold down of up button" illustrated in FIG. 4 is performed.

FIG. 6 is a communication sequence diagram illustrating communication between illumination controller 20 and luminaire 30 when the manipulation "hold down of up button 21a" illustrated in FIG. 4 is performed.

In illumination controller 20, when "bold down of up button 21a" is detected (S30), control processor 23 performs the following processing to continuously increase the dimming level at a constant slope at 200·msec intervals while the "hold down of up button 21a" continues.

First, control processor 23 calculates dimming level L1 which the current dimming level should be after 200 msec in the case of increasing the current dimming level dimming level stored inside) at a constant slope, and generates a dimming command having calculated dimming level L1, to be transmitted for the first time (S31). The "constant slope" is, for example, a proportion in a range from 0% to 100% at which the dimming level changes in 3 seconds. This dimming command has the "type of command" set to "dimming", the "dimming level" set to "L1", and the "fade period" set to 200 (msec). Control processor 23 then transmits the dimming command generated to luminaire 30 (S32).

In luminaire 30, control processor 3d detects that dimming level L1 included in the received, dimming command is different from the current value (dimming level stored inside), and causes light source 36 to illuminate at dimming level L1 (S33).

After a lapse of 200 msec, control processor 23 which has detected, that the "hold down" is continuing generates a dimming command which is to be transmitted for the second time and having dimming level L2 calculated by increasing the current dimming level at the constant slope (S34) and transmits the dimming command generated to luminaire 30 (S35), in the same manner as the dimming command generated and transmitted for the first time.

In luminaire 30, control processor 34 detects that dimming level L2 included in the received dimming command is different from the current value (dimming level stored inside), and causes light source 36 to illuminate at dimming level L2 (S36).

In the same manner, illumination controller 20 generates a dimming command which is to be transmitted for the third time and having dimming level L3 calculated by further increasing the current dimming level at the constant slope (S37) and transmits the dimming command generated to luminaire 30 (S38). In luminaire 30, light source 36 illuminates at dimming level L3 (S39).

Here, when the "hold down of up button 21a" finishes, control processor 23 which has detected the finish of "hold down of up button 21a" stores, in the nonvolatile memory inside control processor 23, dimming level L3 calculated immediately before (S40). Control processor 23 then repeatedly transmits the same dimming command as the dimming command transmitted last (the dimming command transmitted for the third time) to luminaire 30 three times at 200·msec intervals (S41 to S48). This enables luminaire 30 to illuminate at final dimming level L3 because the dimming command specifying final dimming level L3 is repeatedly transmitted even when a problem occurs in the communication circumstance.

In the communication sequence diagram in FIG. 6, new dimming commands are generated at 200·msec intervals while the "hold down of up button 21a" continues (S31, S34, and S37). However, these dimming commands may be collectively generated in the initial stage. That is to say, all the dimming commands that might be used for increasing the dimming level from the current value to the full illumination at a constant slope at 200·msec intervals may be generated at the point when the "hold down of up button 21a" is initially detected.

Figure 7:
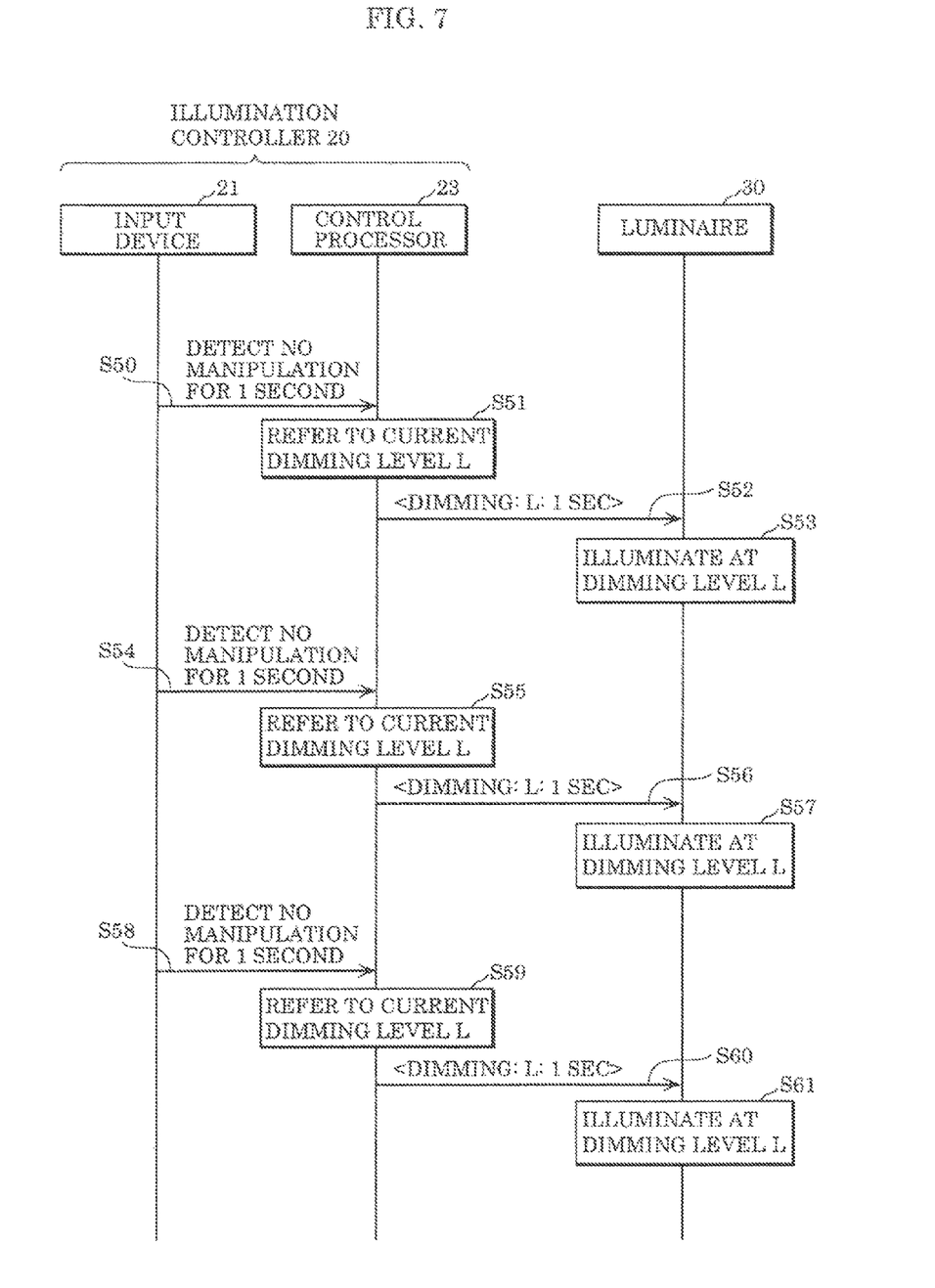
FIG. 7 is a communication sequence diagram illustrating communication between an illumination controller and a luminaire when "no manipulation" illustrated in FIG. 4 is performed.

FIG. 7 is a communication sequence diagram illustrating communication between illumination controller 20 and luminaire 30 when "no manipulation" illustrated in FIG. 4 is performed.

In illumination controller 20, when "no manipulation" is detected (S50), control processor 23 performs the following processing to maintain the illumination of luminaire 30 at the stored dimming level while "no manipulation" continues.

In illumination controller 20, when "no manipulation for 1 second" is detected, control processor 23 refers to current dimming level L (dimming level L stored inside) to generate a dimming command having current dimming level L (S51). Control processor 23 then transmits the dimming command generated to luminaire 30 (S52). In luminaire 30, control processor 34 which has received the dimming command detects that a time period longer than a predetermined interval (for example, 300 msec) has elapsed from the time when a command was received immediately before, and causes light source 36 to illuminate at dimming level L according to the command received (S53).

As long as "no manipulation for 1 second" is detected by illumination controller 20, illumination controller 20 and luminaire 30 repeat the same processing (S54 to S57 and S58 to S61) as Steps S50 to S53 described above.

In such a manner as described above, as long as "no manipulation" continues, the dimming command having the dimming level specified by the dimming command transmitted last in repeatedly transmitted to luminaire 30 at 1·sec intervals, and the illumination state of luminaire 30 is maintained.

As described above, illumination controller 20 included in illumination system 10 of the present embodiment is an apparatus which controls luminaire 30 by transmitting a command to luminaire 30 via radio waves, and includes communication interface circuit 24, input device 21, and control processor 23. Communication interface circuit 24 is configured to communicate with luminaire 30 via radio waves. Input device 21 is configured to obtain a manipulation instruction. Control processor 23 is configured to generate at least a first command and a second command according to a corresponding manipulation instruction obtaining state of input device 21, and transmit the command generated to luminaire 30 via communication interface circuit 24. When control processor 23 has generated the first command according to the manipulation instruction obtaining state, control processor 23 is configured to repeatedly transmit the first command generated to luminaire 30 at first transmission intervals. When control processor 23 has generated the second command according to the manipulation instruction obtaining state, control processor 23 is configured to repeatedly transmit the second command generated to luminaire 30 at second transmission intervals different from the first transmission intervals.

With this, the transmission intervals at which illumination controller 20 repeatedly transmits a command to luminaire 30 are different depending on the type of the command. Thus, even when a plurality of illumination controllers are installed within the reach of radio waves, it is possible to ensure that interference of commands transmitted by the illumination controllers does not easily occur.

The first command is a predetermined command indicating a need to immediately change a state of luminaire 30, and the second command is a predetermined command indicating no need to immediately change the state of luminaire 30. The first transmission intervals are shorter than the second transmission intervals.

With this, the first dimming command indicating a need to immediately change the state of luminaire 30 is repeatedly transmitted at transmission intervals shorter than transmission intervals of the second dimming command indicating no such need. Thus, irritation or a feeling of strangeness imparted to the manipulator is reduced.

The first command is a first dimming command for changing a brightness of luminaire 30, and the second command is a second dimming command tor maintaining the brightness of luminaire 30. Control processor 23 is configured to generate the first command, and repeatedly transmit the first command to luminaire 30 at the first transmission intervals when input device 21 has obtained a manipulation instruction for changing the brightness of luminaire 30. Control processor 23 is also configured to generate the second command and repeatedly transmit the second command to luminaire 30 at the second transmission intervals when input device 21 has obtained no manipulation instruction for at least a certain time period.

With this, the first dimming command indicating a need to change the brightness of luminaire 30 is repeatedly transmitted at transmission intervals shorter than the transmission intervals of the second dimming command indicating no such need. Thus, irritation or a feeling of strangeness imparted to the manipulator in regard to the dimming manipulation is reduced, and interference of commands transmitted by a plurality of illumination controllers is reduced.

Input device 21 includes a dimming button tor changing the brightness of luminaire 30 and an on/off button for turning on and off an operation of illumination controller 20. Input device 21 is configured to obtain a manipulation on the dimming button or the on/off button as the manipulation instruction for changing the brightness of luminaire 30.

With this, the first dimming command for changing the brightness of luminaire 30 is repeatedly transmitted to luminaire 30 at the first transmission intervals when a manipulation for changing the brightness of luminaire 30 is performed and when a manipulation for turning on or off the operation of illumination controller 20 is performed.

The first dimming command includes a parameter specifying the brightness of luminaire 30, and the first dimming command which is repeatedly transmitted, at the first transmission intervals includes a parameter for gradually changing the brightness of luminaire 30, the parameter being changed according to the brightness of luminaire 30.

With this, the repeated transmission of the first dimming command enables the fading of light, that is, a slow change of the brightness of luminaire 30.

A luminaire control method according to the present embodiment is a luminaire control method to be used by illumination controller 20 to control luminaire 30 by transmitting a command to luminaire 30 via radio waves. The method includes generating at least a first command and a second command according to a corresponding manipulation instruction obtaining state, and transmitting the command generated to luminaire 30. In the generating and the transmitting, when the first command is generated according to the manipulation instruction obtaining state, the first command generated is repeatedly transmitted to luminaire 30 at first transmission intervals. When the second command is generated according to the manipulation instruction obtaining state, the second command generated is repeatedly transmitted to luminaire 30 at second transmission intervals different from the first transmission intervals.

With this, the transmission intervals at which illumination controller 20 repeatedly transmits a command to luminaire 30 are different depending on the type of the command. Thus, even when a plurality of illumination controllers are installed within the reach of radio waves, it is possible to ensure that interference of commands transmitted by the illumination controllers does not easily occur.

Although an illumination controller and a luminaire control method according to the present disclosure have been described above based on an embodiment, the present disclosure is not limited to this embodiment. Various modifications to this embodiment which may be conceived by those skilled in the art, as well as embodiments resulting from combinations of some of the structural elements of this embodiment are to be included within the scope of the present disclosure, as long as such modifications and embodiments do not depart from the essence of the present disclosure.

For example, in the above embodiment, the dimming command has been described as an example of the first command which is repeatedly transmitted at the first transmission intervals and the second command which is repeatedly transmitted at the second transmission intervals. The first command and the second command, however, are not limited to the dimming command. As a specific example, the first command may be a pairing command (the type of command is "pairing") by which illumination controller 20 repeatedly transmits the identifier of illumination controller 20 to luminaire 30 at the first transmission intervals (for example, at 100·msec intervals) to enable pairing for wireless communication. Furthermore, the second command may be a communication check command (the type of command is "communication check") by which illumination controller 20 repeatedly transmits the identifier of illumination controller 20 to luminaire 30 at the second transmission intervals (for example, at 10·sec msec for regularly checking that there is no problem with the wireless communication.

In addition, although the above embodiment has illustrated the example of commands which are repeatedly transmitted by illumination controller 20 to luminaire 30, the commands transmitted by illumination controller 20 may include, in addition to the commands which are repeatedly transmitted, a command which is transmitted only once. That is to say, control processor 23 of illumination controller 20 may transmit a predetermined command to luminaire 30 only once according to either a manipulation instruction obtaining state of input device 21 or the operation state of illumination controller 20.

In the above embodiment, the command for changing the brightness of luminaire 30 has been described as an example of the first dimming command transmitted at the first transmission intervals, whereas the command for maintaining the brightness of luminaire 30 has been described as an example of the second dimming command transmitted at the second transmission intervals. The first dimming command and the second dimming command, however, are not limited to these types of commands. For example, the first dimming command may be a command transmitted at 100·msec intervals (the first transmission intervals) for changing the brightness of luminaire 30 over a short time period (for example, a dimming command, specifying a fade period, of 0 msec). The second dimming command may be a command transmitted at 500·msec intervals (the second transmission intervals) for changing the brightness of luminaire 30 over a longer time period (for example, a dimming command specifying a fade period of 500 msec). Even with such classification, the transmission intervals are different depending on the type of the dimming command. Thus, even when a plurality of illumination controllers are installed, it is possible to ensure that interference of commands transmitted by the illumination controllers does not easily occur.

The present disclosure can be implemented not only as the illumination controller and the luminaire control method described in the above embodiment. The present disclosure may be implemented also as an illumination system including an illumination controller and a luminaire. Moreover, the present disclosure may also be implemented as a program which causes a computer to execute the above control method and a computer-readable recording medium such as a CD-ROM on which the program is recorded.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination controller which controls a luminaire by transmitting a command to the luminaire via radio waves, the illumination controller comprising:
   a communication interface circuit configured to communicate with the luminaire via radio waves;
   an input device configured to obtain a manipulation instruction; and
   a control processor configured to generate at least a first command and a second command, according to a corresponding manipulation instruction obtaining state of the input device, and transmit the command generated to the luminaire via the communication interface circuit,
   wherein, when the control processor has generated the first command according to the manipulation instruction obtaining state, the control processor is configured to repeatedly transmit the first command generated to the luminaire at first transmission intervals, and when the control processor has generated the second command according to the manipulation instruction obtaining state, the control processor is configured to repeatedly transmit the second command generated to the luminaire at second transmission intervals different from the first transmission intervals.

2. The illumination controller according to claim 1,
   wherein the first command is a predetermined command indicating a need to immediately change a state of the luminaire,
   the second command is a predetermined command indicating no need to immediately change the state of the luminaire, and
   the first transmission intervals are shorter than the second transmission intervals.

3. The illumination controller according to claim 2,
   wherein the first command is a first dimming command for changing a brightness of the luminaire, and
   the second command is a second dimming command for maintaining the brightness of the luminaire.

4. The illumination controller according to claim 3,
   wherein the control processor is configured to generate the first command and repeatedly transmit the first command to the luminaire at the first transmission intervals when the input device has obtained a manipulation instruction for changing the brightness of the luminaire, and generate the second command and repeatedly transmit the second command to the luminaire at the second transmission intervals when the input device has obtained no manipulation instruction for at least a certain time period.

5. The illumination controller according to claim 4, wherein the input device includes a dimming button for changing the brightness of the luminaire and an on/off button for turning on and off an operation of the illumination controller, and is configured to obtain a manipulation on the dimming button or the on/off button as the manipulation instruction for changing the brightness of the luminaire.

6. The illumination controller according to claim 3, wherein the first dimming command includes a parameter specifying the brightness of the luminaire, and
the first dimming command which is repeatedly transmitted at the first transmission intervals includes a parameter for gradually changing the brightness of the luminaire, the parameter being changed according to the brightness of the luminaire.

7. A luminaire control method to be used by an illumination controller to control a luminaire by transmitting a command to the luminaire via radio waves, the method comprising
generating at least a first command and a second command according to a corresponding manipulation instruction obtaining state, and transmitting the command generated to the luminaire,
wherein, in the generating and the transmitting, when the first command is generated according to the manipulation instruction obtaining state, the first command generated is repeatedly transmitted to the luminaire at first transmission intervals, and when the second command is generated according to the manipulation instruction obtaining state, the second command generated is repeatedly transmitted to the luminaire at second transmission intervals different from the first transmission intervals.

* * * * *